Sept. 23, 1958   H. W. BANTA ET AL   2,852,843
METHOD OF MAKING METAL JOINT
Filed April 25, 1955   4 Sheets-Sheet 1

*INVENTOR.*
H. R. Grant & H. W. Banta
BY
D. Gordon Angus
ATTORNEY

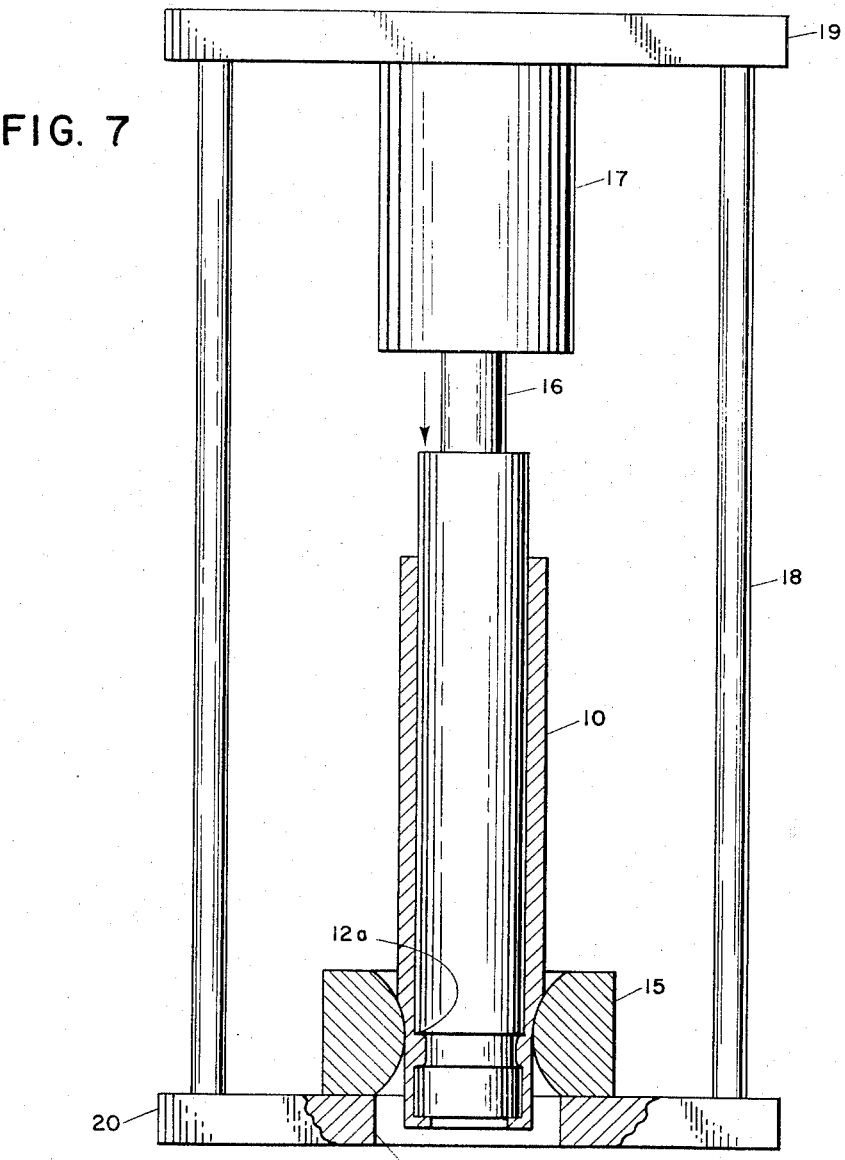
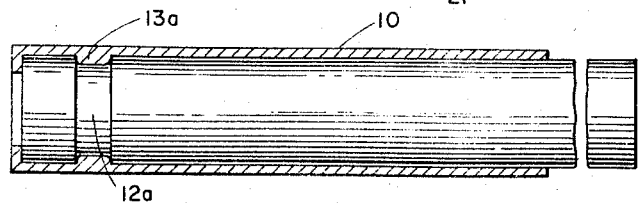

Sept. 23, 1958  H. W. BANTA ET AL  2,852,843
METHOD OF MAKING METAL JOINT
Filed April 25, 1955                                   4 Sheets-Sheet 3
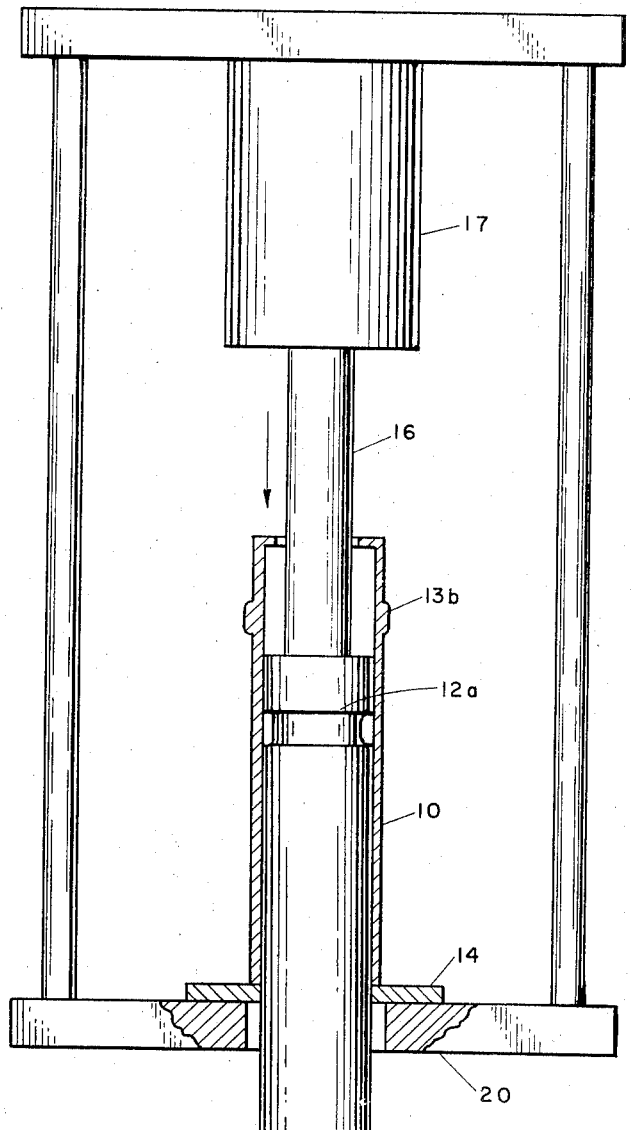
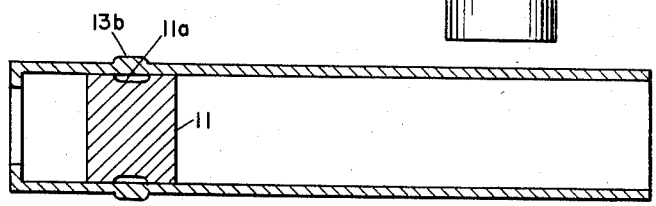
*INVENTOR.*
H.R. Grant & H.W. Banta
BY
ATTORNEY Sept. 23, 1958     H. W. BANTA ET AL     2,852,843
METHOD OF MAKING METAL JOINT
Filed April 25, 1955     4 Sheets-Sheet 4
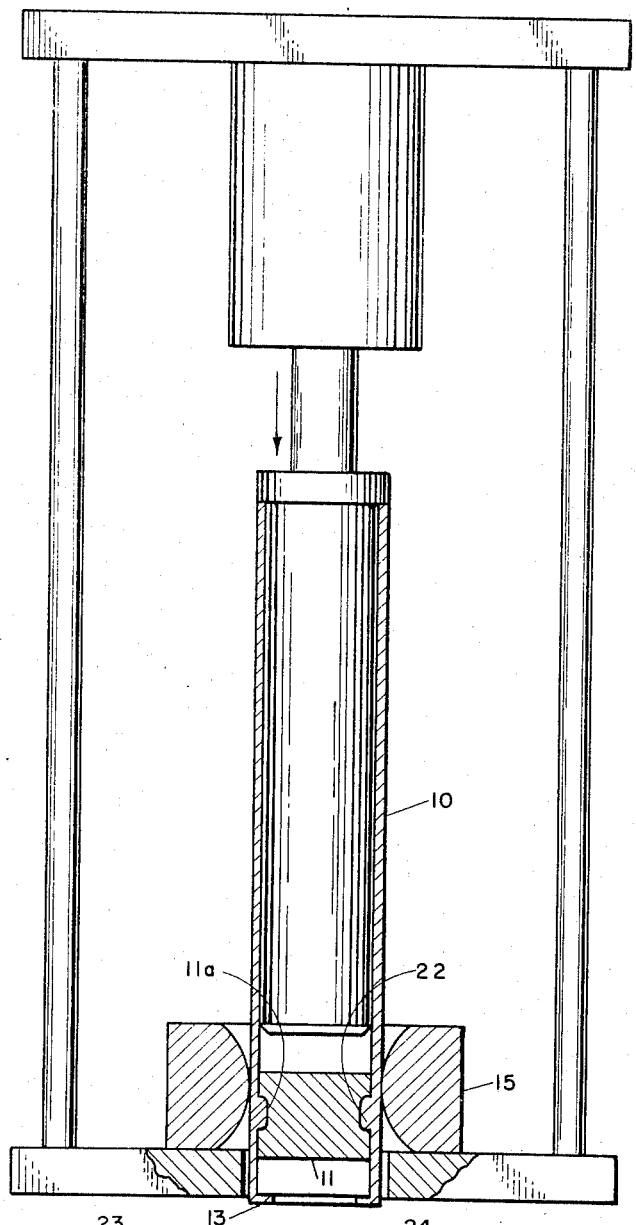
FIG. 11
FIG. 12
*INVENTOR.*
H.R. Grant & H.W. Banta
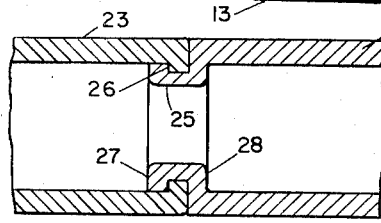
ATTORNEY United States Patent Office 2,852,843
Patented Sept. 23, 1958

2,852,843

METHOD OF MAKING METAL JOINT

Howard W. Banta, San Gabriel, and Harold R. Grant, Glendora, Calif., assignors to Aerojet-General Corporation, Azusa, Calif., a corporation of Ohio Application April 25, 1955, Serial No. 503,674

3 Claims. (Cl. 29—517)

This invention relates to junctions of metal parts and has for its principal object to provide a process for forming a tight joint between two or more such parts.

The invention is carried out by a series of operations including cold working of at least one of the parts, with the result that there can be obtained an extremely strong junction.

A feature of the invention resides in the cold working of one of the parts which should comprise a tubular member provided with an external circumferential collar composed of the tube material. A second part to be joined to the tubular part is provided with an internal circumferential recess and fitted within the tubular part so that its recess is opposite the collar. This is then followed by passing the combination of the two parts through a die to eliminate the external collar and form an internal collar, which will fill the recess of the second part with material of the tube.

An effective method of performing the operation is to fit a circumferential recessed mandrel within the tubular part so as to hold the part to the mandrel while the tubular part is passed through a reducing die. This has the effect of reducing the thickness of the cylinder by a well known cold working method. This pass will fill the circumferential recess of the mandrel with material from the tube, forming an internal collar on the tube. A subsequent step resides in removing the recessed mandrel from the hollow tube so that there is formed around the outside of the tube a mass of metal in the form of a collar located opposite the position where the internal collar originally formed in the mandrel recess.

The foregoing and other features of the invention will be better understood from the following detailed description and the accompanying drawing of which:

Figure 7 shows a step in the process according to the invention;

Figure 8 illustrates the cylinder subsequent to the step in the process shown in Figure 7;

Figure 9 illustrates a still further step in the process;

Figure 10 shows another step of the process;

Figure 11 shows a further step in the process; and

Figure 12 illustrates another form of junction which can be made according to this invention.

Figure 1:
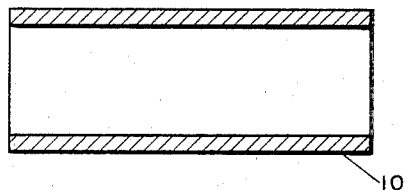
Figure 1 is a longitudinal cross section view of a cylindrical form which can be used in the practice of this invention.
Figure 2:
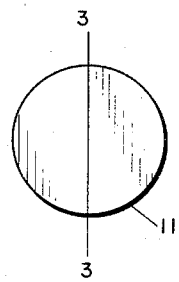
Figure 2 is an end view of a plug or mating part to be joined to the form of Figure 1.
Figure 3:
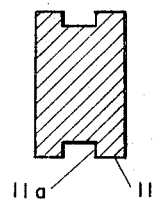
Figure 3 is a cross section view taken at line 3—3 of Figure 2.
Figure 4:
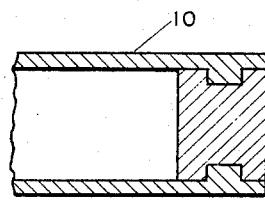
Figure 4 shows an arrangement of the plug or mating part of Figure 3 in the cylinder of Figure 1, which has been formed in accordance with this invention.

Referring to the drawing, Figure 1 shows a hollow tube in the form of a cylinder 10, ordinarily of steel, although any other workable metal could be used. Figures 2 and 3 show another metal part 11 in the form of a plug which it is desired to attach to the part 10 by a firm joint to form a closed end cylinder as shown in Figure 4.

The following described operations in forming the joint may be performed on a press, or draw bench, or the like, wherein the use of mandrels, dies and strippers is well known.

Figure 5:
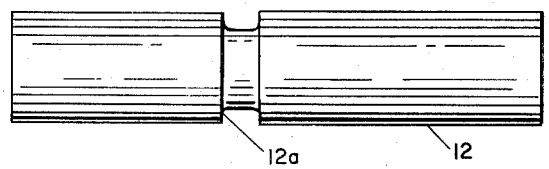
Figure 5 shows a mandrel usable in the process.
Figure 6:
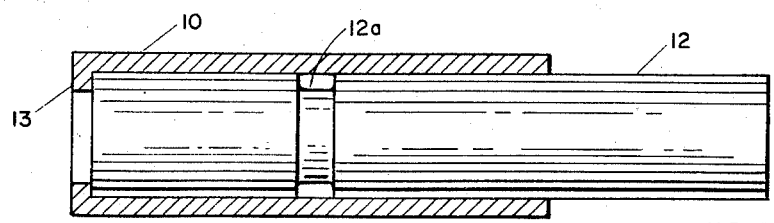
Figure 6 shows the mandrel of Figure 5 associated with the form of Figure 1.

The operation is carried out in accordance with the invention by use of a mandrel 12 as shown in Figure 5. This is a cylindrical member when the tube 10 is cylindrical, ordinarily solid, and it has an annular or circumferential recess 12a located around its periphery. To enable the mandrel to be held in pushing relationship within the cylinder 10, the ends of the cylinder are turned over to form the shoulder 13 as shown in Figure 6 so that the shoulder acts as a stop for the mandrel 12 within the cylinder.

The cylinder is then passed through a suitable die 15 (Figure 7) in a manner to produce a flow of the metal of the cylinder. Since both the die and the mandrel are of relatively unyielding material, the metal of the cylinder will flow in a manner to reduce its thickness as it is passed through the die, as illustrated in Figure 7. This is a cold working operation which can be done without failure of the part.

In Figure 7 there is shown a press in which the operation may be performed. This comprises a ram 16 within a cylinder 17 to which a hydraulic fluid may be supplied under pressure through a conduit (not shown) in a well-known manner to move the ram outwardly from the cylinder. This will push the mandrel with the cylinder 10 through the die 15 which is held fixed relative to cylinder 17, by tension arms 18 connecting head 19 connected with cylinder 17 and head 20 which restrains the die. An opening 21 is provided through head 20 so that the mandrel and cylinder 10 may pass through it. It will be recognized that Figure 7 simply shows in outline form, for purposes of explanation, the initial elements of a press or ram.

As the die passes over the region of the recess 12a of the mandrel, the cylinder material will be pushed into this recess as shown in Figure 7 so that the form of the member 10 will become as shown in Figure 8, wherein the member 10 is of uniform thickness except for the internal collar 13a which will lie within the recess 12a of the mandrel.

In the next operation, the position of the mandrel is reversed in the press, and a suitable stop or stripper 14 is placed against head 20 at the rear end of the cylinder 10 as shown in Figure 9 and the mandrel is then forceably pushed from the cylinder 10 by outward movement of the ram from its cylinder 17. For this purpose the end of the ram is placed against the end of the mandrel. The stripper plate 14 should, of course, have an opening large enough to permit passage of the mandrel through it and small enough to restrain cylinder 10. The action of withdrawing the mandrel will have the effect of forcing the metal within recess 12a out of the recess so that the internal surface of member 10 becomes a uniform cylinder; and the metal pushes outwardly to form an outer ring or collar 13b as shown in Figure 9.

In the next step, the member 11 is placed within the cylindrical member 10 with the circumferential recess 11a opposite the external collar 13b of the cylinder, as shown in Figure 10, and it may be convenient to locate member 11 at its proper position by a suitable spacer, from the ends of cylinder 10. Then a pass is made in the press by pushing the cylinder 10 through the die 15 again which will have the effect of forcing the mass of collar 13b inwardly to push material into the recess 11a where it is shown in Figure 11 as the mass 22. Since all of these operations are cold working operations, the effect is to provide a very strong cylinder even though its walls are thin and a very strong joint with member 11. In fact, the joint can easily be so strong that ultimate rupture will occur elsewhere than at the joint.

Ordinarily, the shoulder 13 will be removed from the cylinder after the joint is made; and the portion of the cylinder back of the plug 11 may be removed by cutting off, if desired, so that the final construction can be as shown in Figure 4.

It will be understood that although the construction of Figure 4 is illustrative of the invention, but the invention is not limited to it. The joint shown in Figure 4 may be had with other forms of parts. For example, there may be formed by the same process the structure shown in Figure 12 wherein the member 23 corresponds to the cylinder 10 and the member 24 corresponds with the plug 11. In forming the structure of Figure 12 the operations on the member 23 by use of the mandrel will be similar to the above described operations on the cylinder 10. The member 24 has the region 25 comprising a recess 26 between two side portions 27 and 28; and these portions correspond to the recess 11a and the remainder of part 11 in Figure 3.

The particular method described above and illustrated in the drawings is given by way of illustration rather than of limitation. It will be understood, furthermore, that the shape of the tube 10 need not necessarily be cylindrical as illustrated. It might, for example, have some other suitable cross section shape, such as square, rectangular, or oval; and the cross section of the plug will be made to correspond with that of the tube.

Moreover, the provision of the tube with its outer collar 13b, as illustrated in Figure 9, need not necessarily be performed by the mandrel and die operations represented by Figures 5 to 8. It could, for example, be made by machining a tubular piece to leave the external collar 13b, shown in Figure 9. Or alternatively, the provision of the collar 13b on the tube could be performed by an upset operation. Both machining and upsetting operations for the purpose of forming such a collar are well known and need no detailed discussion here. Regardless of how the tube with its collar 13b, as shown in Figure 9, is provided, the subsequent steps in the operation are the same as described above. That is, the recessed plug will be inserted within the tube with the recess opposite the collar 13b; and the relative motion of the tube and collar past the die will force material from the tube into the recess of the plug.

A hydraulic press is a convenient mechanism on which the above operations can be performed. It should be understood, however, that the operations are not limited to use on a hydraulic press. Other devices for handling mandrels, dies, and strippers, such as draw benches or mechanical presses would be useful mechanisms for exerting the desired forces on the parts.

We claim:

1. The method of joining together two metal members, a first of which comprises a tubular form and the second of which comprises the form of a recessed member adapted to be fitted to the tube, said method comprising mounting the tube on a mandrel provided with a circumferential recess, forcing the tube on the mandrel through an external die to reduce the thickness of the tube wall by a cold working flow of the metal, and forcing the metal of the tube into the recess of the mandrel, then forceably withdrawing the mandrel from the tube, thereby forcing the metal out of the recess of the mandrel and producing a circumferential collar of the metal on the tube at a position opposite the position where the recess of the mandrel was located, then fitting at least a portion of the second member within that part of the tube which is surrounded by the collar, and then passing the tube through an external die to eradicate the collar and force the metal of the tube into the recess of the second member, whereby a secure joint is formed between the first and second members.

2. The method of joining together two rigid metal members, a first of which comprises a tube and the second of which comprises a tube having an end portion having the form of a recessed member adapted to be fitted to the first tube, said method comprising mounting the first tube on a mandrel provided with a circumferential recess, forcing the first tube on the mandrel through an external die to reduce the thickness of the first tube wall by a cold working flow of the metal, and forcing the metal of the first tube into the recess of the mandrel, then forcibly withdrawing the mandrel from the first tube, thereby forcing the metal out of the recess of the mandrel and producing a circumferential collar of metal on the first tube at a position where the recess of the mandrel was located, then fitting the recessed end portion of the second tube within that part of the first tube which is surrounded by the collar, and then passing the first tube through an external die to eradicate the collar and force the metal of the first tube into the recess of the end portion of the second tube whereby a secure joint is formed between the first tube and the second tube.

3. The method of joining together two rigid metal members at an end of each of the metal members, a first of which comprises a tube and the second of which comprises a recessed member adapted to be fitted at an end of the tube, said method comprising mounting the tube on a mandrel provided with a circumferential recess in such a manner that said circumferential recess is located within the tube immediately adjacent to the end of the tube, forcing the tube on the mandrel through an external die to reduce the thickness of the tube wall by a cold working flow of the metal, and forcing the metal of the tube into the recess of the mandrel, then forcibly withdrawing the mandrel from the tube, thereby forcing the metal out of the recess of the mandrel and producing a circumferential collar of the metal on the tube at a position opposite the position where the recess of the mandrel was located, then fitting the recessed member within that part of the tube which is surrounded by the circumferential collar, and then passing the tube through an external die to eradicate the collar and force the metal of the tube into the recess of the second member, whereby a secure joint is formed between the first and second members.

References Cited in the file of this patent

UNITED STATES PATENTS

| 1,711,832 | Cooper | May 7, 1929 |
|---|---|---|
| 1,744,199 | Baker | Jan. 21, 1930 |
| 1,752,976 | Cowles | Apr. 1, 1930 |
| 1,823,158 | Mogford | Sept. 15, 1931 |
| 2,399,790 | Conroy | May 7, 1946 |